United States Patent
Isoyama

(10) Patent No.: US 7,948,998 B2
(45) Date of Patent: May 24, 2011

(54) VEHICLE-MOUNTED LAN SYSTEM, ELECTRONIC CONTROL UNIT, RELAY CONNECTION UNIT, AND VEHICLE-MOUNTED LAN COMMUNICATION MEANS

(75) Inventor: Yoshikazu Isoyama, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 12/310,494

(22) PCT Filed: Aug. 27, 2007

(86) PCT No.: PCT/JP2007/066547
§ 371 (c)(1),
(2), (4) Date: Feb. 26, 2009

(87) PCT Pub. No.: WO2008/032554
PCT Pub. Date: Mar. 20, 2008

(65) Prior Publication Data
US 2010/0002710 A1    Jan. 7, 2010

(30) Foreign Application Priority Data
Sep. 13, 2006  (JP) ................................. 2006-248475

(51) Int. Cl.
*H04L 12/56* (2006.01)
(52) U.S. Cl. ....................................................... 370/401
(58) Field of Classification Search .................. 370/229, 370/230, 235, 252, 270, 351, 392, 395.1, 370/395.5, 395.52, 400–401, 428
See application file for complete search history.

(56) References Cited

U.S. PATENT DOCUMENTS

| | | | |
|---|---|---|---|
| 6,873,603 B1 | 3/2005 | Ivaturi | |
| 6,982,983 B2 | 1/2006 | Ota et al. | |
| 7,602,915 B2* | 10/2009 | Iwamura | 380/259 |
| 2007/0100513 A1* | 5/2007 | Asano | 701/2 |

FOREIGN PATENT DOCUMENTS

| | | |
|---|---|---|
| DE | 10 2005 028 936 A1 | 1/2006 |
| DE | 600 26 734 T2 | 9/2006 |
| EP | 0 710 415 B1 | 4/2005 |
| JP | A-07-273787 | 10/1995 |
| JP | A-11-205389 | 7/1999 |
| JP | A-2001-320396 | 11/2001 |
| JP | A-2006-211295 | 8/2006 |

OTHER PUBLICATIONS

Sep. 20, 2010 Office Action issued in German Patent Application No. 11 2007 002 147 (with translation).

* cited by examiner

Primary Examiner — Frank Duong
(74) Attorney, Agent, or Firm — Oliff & Berridge, PLC

(57) ABSTRACT

A vehicle-mounted Local Area Network (LAN) system includes vehicle-mounted LANs in each of which an electronic control unit is connected to a communication line to send and receive messages. The LAN system also includes a relay connection unit that relays the messages between the vehicle-mounted LANs. Each electronic control unit has a reception port for transmitting a reception confirmation signal to the relay connection unit in response to a received message. The relay connection unit has a relay management device that determines, based on the presence or absence of the reception confirmation signal responsive to the message relayed to each of the vehicle-mounted LANs, whether or not a relay is required, and that then updates relay processing information stored in a storage device.

7 Claims, 2 Drawing Sheets

VEHICLE-MOUNTED LAN SYSTEM, ELECTRONIC CONTROL UNIT, RELAY CONNECTION UNIT, AND VEHICLE-MOUNTED LAN COMMUNICATION MEANS

TECHNICAL FIELD

The present invention relates to a LAN system mounted on a vehicle, an electronic control unit, a relay connection unit, and a communication means of the LAN mounted on a vehicle. A plurality of LANs mounted on a vehicle is connected to each other through the relay connection unit.

BACKGROUND ART

Conventionally a terminal of an information appliance is connected with a LAN constructed in an office and a homes. A plurality of LANs is connected with each other with gateways (relay connection unit). The gateway has relay processing information (routing information) indicating a LAN to which a received message is relayed.

In each LAN, a system construction such as the disposition of the terminal of the information appliance, the number of the terminals thereof, and the like is arbitrarily altered. Thus in the gateway (relay connection unit) connected with the LANs, various methods of managing the routing information of altering the relay processing information in correspondence to the change of the system construction have been proposed.

For example, disclosed in Japanese Patent Application Laid-Open No. 7-273787 (Patent document 1) is a method of managing the routing information of discriminating whether a message transmitted from each terminal is a message for relay or for altering the relay processing information and executing a series of processing reconstructing the relay processing information for routing use by using a dedicated processor if the message is for altering the relay processing information. That is, in general networks, as methods of dynamically generating the relay processing information, a message for altering the relay processing information is sent and received by using a dedicated protocol such as a RIP (Routing Information Protocol), an OSPF (Open Shortest Path First), and a BGP (Border Gateway Protocol).

In a car, a plurality of LANs including CAN mounted on a vehicle is constructed, and the LANs are connected with one another by means of the relay connection unit.

In the LAN system mounted on the vehicle, the dispositions of electronic control units to be connected with the LAN mounted on the vehicle are set. Normally the connection state of each electronic control unit is not altered.

Therefore the relay connection unit in the LAN system mounted on the vehicle beforehand stores the relay processing information (routing information) showing an electronic control unit to which a received message is relayed as a program and does not generate the relay processing information unlike the LAN system constructed in offices and homes.

In the LAN system mounted on the vehicle, basically a message is broadcast and the destination of the message is not fixed unlike the general LAN system in which uni-cast is performed. Therefore an established protocol for constructing the relay processing information for relaying a message is not present in the LAN system mounted on the vehicle. Thus the LAN system mounted on the vehicle has an aspect that it is incapable of generating the relay processing information.

Patent document 1: Japanese Patent Application Laid-Open No. 7-273787

DISCLOSURE OF THE INVENTION

Problem to be Solved by the Invention

When the relay processing information is fixedly set as in the case of the relay connection unit of the conventional LAN system mounted on a vehicle, there arises a problem that it is necessary to adjust the relay processing information according to alteration of a system in the form of addition in a designing stage of the vehicle.

The relay processing information conforming to a kind of vehicles on which the relay connection unit is mounted is set in a software manner although the relay connection unit has the same hardware construction. Thus to mount the relay connection unit on a vehicle on which a LAN system having a different construction is mounted, it is necessary to set different relay processing information according to the kind of vehicles. Thus the conventional LAN system mounted on the vehicle has a problem that there is an increase in the number of types of the relay connection unit, which causes inventory control to be complicated.

In addition, when an optional electronic control unit is additionally connected to the LAN mounted on the vehicle, unless the relay processing information is newly constructed, there arises a problem that the optional electronic control unit is incapable of receiving a necessary message when the relay processing information is fixedly set.

The present invention has been made in view of the above-described problems. It is an object of the present invention to generate relay processing information without each electronic control unit sending a message for generating the relay processing information so that it is possible to comply with addition alteration of a LAN system mounted on a vehicle and use a relay connection unit commonly to different kinds of vehicles.

Means for Solving the Problem

To solve the above-described problems, the present invention provides a LAN system mounted on a vehicle comprising a plurality of LANs, mounted on the vehicle, each having at least one electronic control unit connected with a communication line to send and receive messages; and a relay connection unit, connected with the communication line, for relaying the messages between the LANs mounted on the vehicle, wherein each of the electronic control units has a reception port having a function of sending a reception confirmation signal to the relay connection unit in response to the received message; and the relay connection unit has a relay management means for judging whether relay is necessary according to whether the reception confirmation signal has been sent in response to the message relayed to each of the LANs mounted on the vehicle, and updating relay processing information stored in a storing means.

More specifically, it is preferable that each of the electronic control units has a recording means for recording identification information of messages to be received; and the reception port having a function of selectively receiving the messages indicating the identification information recorded in the recording means and sending a reception confirmation signal to the relay connection unit in response to the received message, and the relay connection unit has a storing means for storing relay processing information, of messages received through ports connected with each of the LANs mounted on the vehicle, indicating a relationship between identification information to be relayed and a relay port; a relay processing means for executing relay processing of the messages indicating the identification information stored in the storing means; and a relay management means for judging whether relay is necessary according to whether the reception confirmation signal has been sent in response to the message relayed to each of the LANs mounted on the vehicle, and updating relay processing information stored in a storing means.

In the above-described construction, when each of the electronic control units receives the message necessary to be received from the relay connection unit, the reception port of each electronic control unit sends the reception confirmation signal to the relay connection unit in response to the received message. Thus of the messages relayed to each of the LANs mounted on vehicle from the relay connection unit, the message necessary for each of the electronic control units can be distinguished by means of the reception confirmation signal. Although the recording means may be formed separately from the reception port, the recording means may be provided inside an integrated circuit constructing the reception port.

The relay management means of the relay connection unit is capable of judging whether it is necessary to relay each message according to whether the reception confirmation signal has been sent from the reception port of each of the electronic control units, thereby updating the relay processing information stored in the storing means.

That is, by using only the reception confirmation signal sent from each of the electronic control units when each electronic control unit receives the necessary message, the relay connection unit is capable of updating the relay processing information. Therefore it is unnecessary for each of the electronic control units to send the message of control information conforming to a new protocol. Thus burden is not imposed on the electronic control unit.

Even though the connection state of each electronic control unit is altered, it is possible to set the relay processing information capable of flexibly coping with an altered connection state. Therefore it is possible to alter the LAN system mounted on a vehicle and apply the LAN system to different kinds of vehicles. Further because it is possible to use the relay connection unit commonly to a large number of kinds of vehicles, inventory control can be easily made.

Further, when an optional electronic control unit is additionally connected to the LAN mounted on the vehicle, by confirming the message required by the electronic control unit by the reception confirmation signal, the relay processing information can be updated. That is, it is possible to securely relay the necessary message to the electronic control unit additionally connected to the LAN mounted on the vehicle.

The storing means of the relay connection unit may fixedly and beforehand store the relay processing information for relaying an important message and the relay processing information capable of limiting the relay range of the important message to be protected for security. But the storing means may be so constructed as to execute relay processing suitable for a present state by deleting all relay processing information at an actuation time and a reset time.

It is preferable that when the relay management means of the relay connection unit receives identification information not included in the relay processing information, the relay management means newly registers the identification information in the relay processing information so that relay transmission is executed for all ports except the reception port.

In the above-described construction, when the relay management means receives a new message having identification information not recorded as the relay processing information, the relay management means relays the message to all the LANs mounted on the vehicle to which the message can be relayed. Thereby the relay management means is capable of securely relaying the message to the electronic control unit that requires this message.

It is preferable that when the reception confirmation signal is not sent in response to the message relayed based on the relay processing information, the relay management means has an unsent number-of-times counter for counting a number of times at which the reception confirmation signal is not successively sent for each of the identification information or/and an unsent time period timer for counting a period of time in which the reception confirmation signal is not sent for each of the identification information.

When a value counted by the unsent number-of-times counter or/and a value, indicating a length of the period of time, which is counted by the unsent time period timer exceed a reference value respectively, the relay management means judges that relay transmission is unnecessary for the LAN mounted on the vehicle from which the reception confirmation signal has not been sent in response to the message.

In the above-described construction, the reference value is set for the number of times at which the reception confirmation signal is not sent in response to the relayed message or for the period of time in which the reception confirmation signal is not sent in response to the relayed message. Therefore when the value counted by the unsent number-of-times counter or the value counted by the unsent time period timer exceeds the reference value, the relay management means judges that the electronic control unit which requires the message is not connected to the LAN mounted on the vehicle, thus stopping the relay. On the other hand, when the reception confirmation signal has not been sent in response but the values do not exceed the reference values, the relay management means judges that the reception confirmation signal has not been sent in response owing to an accidental communication failure, thus continuing the relay.

That is, when a situation where the reception confirmation signal is not sent in response is generated owing to an accidental communication failure, a situation where the reception confirmation signal is not sent in response is intermittently generated. Thus it is possible to distinguish a situation where the relay of the message having predetermined identification information is unnecessary from a situation where the reception confirmation signal is not sent owing to communication failure.

When the number of times at which the reception confirmation signal is not successively sent is counted by using the unsent number-of-times counter and when the counted number of times is compared with the reference value, it is possible to distinguish the state of the communication failure from the message-unrequired state irrespective of a sending interval of messages.

In counting the period of time in which the reception confirmation signal is not successively sent and comparing a counted period of time with the reference value, the reference value is set as a time interval at which communication failure occurs owing to noise or the like. Thereby it is possible to distinguish the state of the communication failure and the message-unrequired state from each other.

It is preferable that the relay connection unit has a communication load factor monitoring means for monitoring a communication load factor of each of the LANs mounted on the vehicle, and that the relay management means relays a message, relay of which has been already judged to be unnecessary, thus periodically updates the relay processing information by using the reception confirmation signal in response.

In the above-described construction, when the communication load factor of the LAN mounted on the vehicle has decreased after the relay processing information is generated or at regular intervals, the relay connection unit relays a message, the relay of which has been already judged thereby to be unnecessary to the LAN mounted on the vehicle. When the reception confirmation signal is sent to the relay connection unit from the electronic control unit in response to the relayed message, the relay management means judges that the relay of the message is necessary and updates the relay processing information. When the reception confirmation signal is not sent to the relay connection unit from the electronic control unit in response to the relayed message, the relay management means judges that the relay of the message is unnecessary, thus suspending the relay.

When a situation where the reception confirmation signal is not sent from the electronic control unit in response to the relay connection unit is generated because the construction of the LAN mounted on the vehicle has dynamically changed or because an unpredictable situation such as the communication failure has occurred and thus when the relay processing information indicating that the relay of the message is unnecessary is generated, the message indicating the stop of the relay is sent to the LAN mounted on the vehicle. Thereby the relay management means judges again whether the electronic control unit requires a message and is capable of periodically updating the relay processing information.

It is preferable that the reception port of the electronic control unit has an identification reception processing means, composed of a hardware, for sequentially comparing identification information of a message being received with identification information recorded in the recording means and suspending reception of a message which is not coincident with the identification information recorded in the recording means.

In the above-described construction, owing to hardware processing executed by the reception port of the electronic control unit, the reception port is capable of receiving a necessary message by discrimination between necessary and unnecessary messages relayed to the LAN mounted on the vehicle by means of the identification information of received messages. Thus it is unnecessary for the control means inside the electronic control unit to execute unnecessary internal processing because the control means does not receive the unnecessary message. Therefore it is possible for the electronic control unit to have a small amount of the internal processing. Even though there is an increase in the amount of messages owing to an increase of the number of the electronic control units connected with the LAN mounted on the vehicle, it is possible to decrease the cost of producing the processing means for executing the internal processing of the electronic control units.

The second invention provides an electronic control unit having a reception port connected to a LAN mounted on a vehicle. The electronic control unit has a recording means for recording identification information of a message to be received. The reception port has a function of selectively receiving a message holding the identification information recorded in the recording means and sending a reception confirmation signal in response to the received message to a port which has sent the message.

In the above-described construction, the reception port is capable of receiving a necessary message by discrimination between necessary and unnecessary messages relayed to the LAN mounted on the vehicle by means of the identification information of received messages. Thus it is unnecessary for the control means inside the electronic control unit to execute unnecessary internal processing because the control means does not receive the unnecessary message. Therefore it is possible for the electronic control unit to have a small amount of the internal processing. Even though there is an increase in the amount of messages owing to an increase of the number of the electronic control units connected with the LAN mounted on the vehicle, it is possible to decrease the cost of producing the processing means for executing the internal processing of the electronic control units.

The third invention provides a relay connection unit, connected to a plurality of LANs mounted on a vehicle, for relaying messages between LANs mounted on the vehicle, including:

a storing means for storing relay processing information, of messages received through ports connected with the LANs mounted on the vehicle, indicating a relationship between identification information to be relayed and a relay port;

a relay processing means for executing relay processing of a message having the identification information stored in the storing means; and a relay management means for judging whether relay is necessary according to whether a reception confirmation signal has been sent in response to the message relayed to each of the LANs mounted on the vehicle, and updating relay processing information stored in the storing means.

In the relay connection unit, the storing means stores the relationship between the identification information to be relayed and the relay port. Thus based on the identification information, the relay processing means is capable of appropriately relaying messages. The relay management means judges whether relay is necessary according to whether the reception confirmation signal has been sent in response to the relayed message. Therefore there is no need of relaying unnecessary messages and it is possible to accomplish efficient relay of messages. Further the relay connection unit is capable of coping with the alteration of the LAN system mounted on the vehicle.

The fourth invention provides a communication means connected to a LAN mounted on a vehicle, comprising:

a recording means for recording identification information of a message to be received;

an identification reception processing means, composed of a hardware, for sequentially comparing identification information of a message being received with identification information recorded in the recording means and suspending reception of a message which is not coincident with the identification information recorded in the recording means; and a reception confirmation responding means for sending a reception confirmation signal in response when the reception confirmation responding means is capable of correctly receiving the message holding the identification information recorded in the recording means.

The identification reception processing means receives only a necessary message having the identification information recorded in the recording means by discrimination between necessary and unnecessary messages by executing hardware processing. Thus it is unnecessary to execute unnecessary internal processing because unnecessary messages are not received. Thus it is possible to process signals simply in electronic circuits connected to the communication means of the LAN mounted on the vehicle. The reception confirmation responding means sends the reception confirmation signal in response to the message received correctly thereby. Therefore a transmitter who sends the message is capable of confirming that the message has been received and that the message is necessary.

EFFECT OF THE INVENTION

As described above, in the present invention, the relay processing information can be easily updated according to whether the reception confirmation signal has been sent. Therefore when an optional electronic control unit is additionally connected to the LAN mounted on a vehicle, a message can be reliably relayed to the electronic control unit additionally connected to the LAN, and the system of the LAN mounted on the vehicle can be easily altered.

EXPLANATION OF REFERENCE NUMERALS AND SYMBOLS

Figure 1:
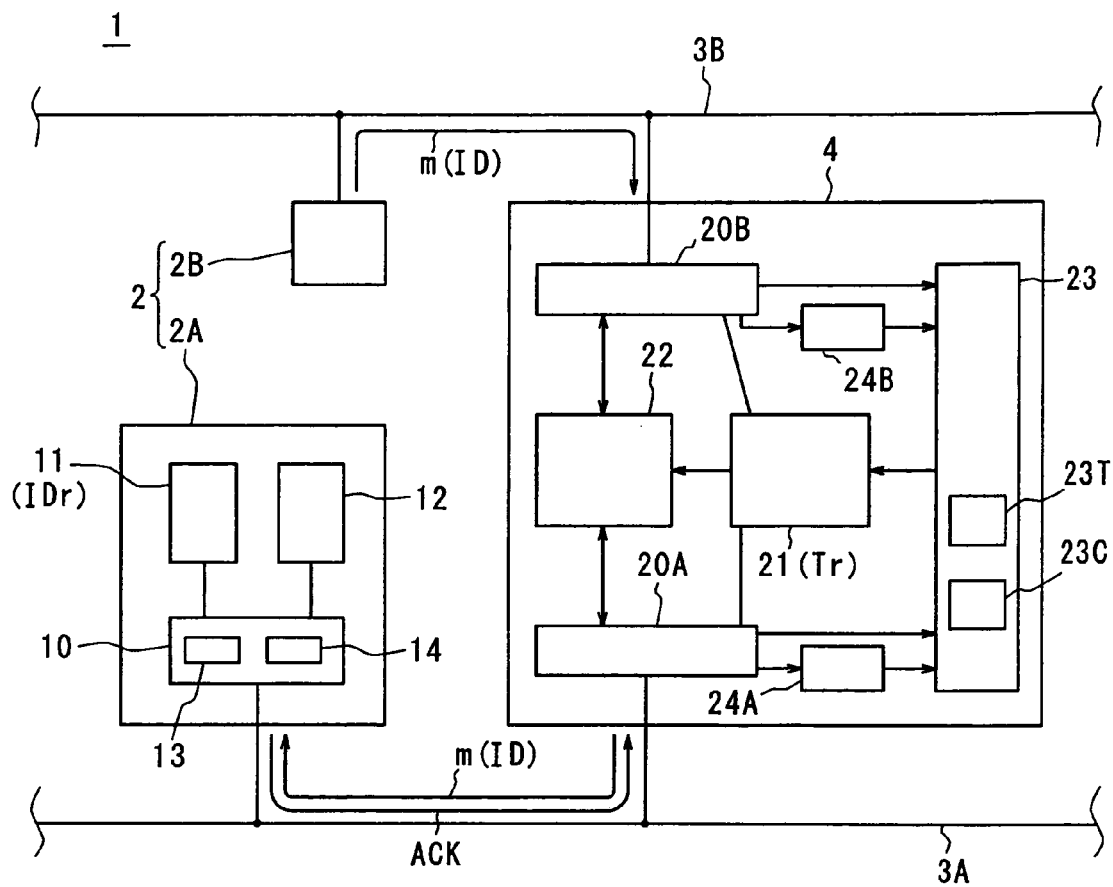
FIG. 1 shows the construction of a LAN system of the present invention mounted on a vehicle.

1: LAN system mounted on a vehicle
2: electronic control unit
3: LAN mounted on a vehicle
3A, 3B . . . : communication line
4: relay connection unit
10: communication means of LAN mounted on vehicle (reception port)
11: recording means
13: identification reception processing means
14: reception confirmation responding means
20A, . . . : port
21: storing means
22: relay processing means
23: relay management means
23T: unsent time period timer
23C: unsent number-of-times counter
24A: communication load factor monitoring means
m: message
ACK: reception confirmation signal
ID: identification information
Tr: relay processing information
IDr: information to be received

BEST MODE FOR CARRYING OUT THE INVENTION

Figure 2:
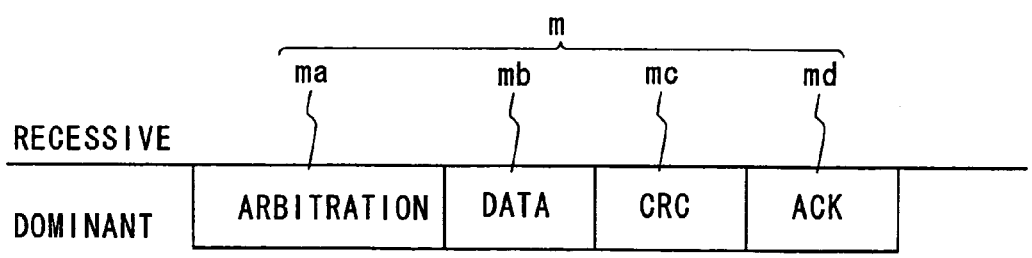
FIG. 2 shows a format of each message.
Figure 3:
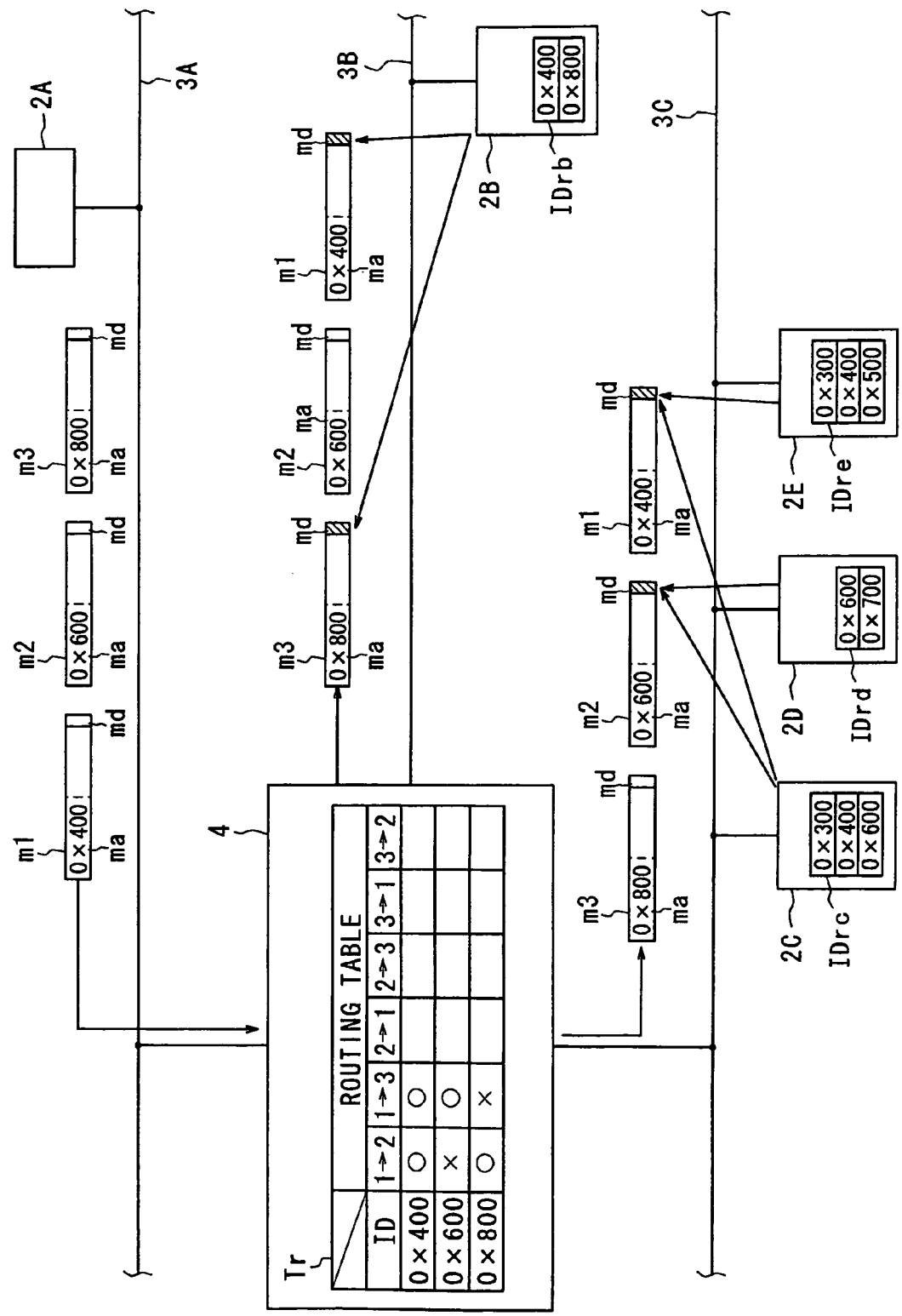
FIG. 3 shows an example of routing performed by using the LAN system of the present invention mounted on a vehicle.

The embodiments of the present invention are described below with reference to the drawings.
FIGS. 1 through 3 show a first embodiment of the present invention.
FIG. 1 shows the construction of a LAN system 1 of the present invention mounted on a vehicle. In FIG. 1, a reference numeral 2 denotes an electronic control unit; a reference numeral 3 denotes a LAN, which is mounted on the vehicle, connected with the electronic control unit 2, and conforms to various standards such as CAN, for sending and receiving messages m; reference numerals 3A, 3B . . . (FIG. 1 shows only communication lines 3A, 3B of the LAN 3 mounted on vehicle) denote communication lines, of the LAN 3 mounted on the vehicle, which are composed of a pair of twist electric wires; reference numeral 4 denotes a relay connection unit, connected with the communication lines 3A, 3B, . . . of a plurality of the LANs 3 mounted on the vehicle, for relaying messages among the LANs 3 mounted on the vehicle.
The electronic control unit 2 has a port (LAN communication means mounted on vehicle) 10, connected with the LAN 3 (communication lines 3A, 3B, . . . ) mounted on the vehicle, having a function of sending and receiving the messages m; a recording means 11, connected with the port 10, for recording information IDr, to be received, indicating identification information of the messages m to be received; and a processing means 12, connected with the port 10, for controlling various objects, to be controlled, connected with the electronic control unit 2.

The recording means 11 may be provided inside the LAN communication means 10 mounted on the vehicle with the recording means 11 held integrally with the LAN communication means 10. The port 10 may have only the function of receiving the messages m, but in the first embodiment, the port 10 has the function of sending and receiving the messages m.

The port 10 has an identification reception processing means 13, composed of a hardware, for sequentially comparing identification information ID of a message being received with identification information ID in the information IDr to be received recorded in the recording means 11 and suspending the reception of the message m which is not coincident with the identification information ID recorded in the recording means 11; and a reception confirmation responding means 14 for sending a reception confirmation signal ACK in response to the message m to be received when the reception confirmation responding means 14 is capable of correctly receiving the message m.

The relay connection unit 4 has a plurality of ports 20A, 20B, the number of which corresponds to that of the LANs 3, mounted on the vehicle, to which messages are relayed; a storing means 21 for storing relay processing information Tr, of messages m received through the ports 20A, 20B, indicating the relationship between the identification information ID to be relayed and the relay ports 20A, 20B; a relay processing means 22, connected with the storing means 21, for executing relay processing of the message m having the identification information ID stored in the storing means 21; a relay management means 23, connected with the storing means 21 and the ports 20A, 20B, for judging whether relay is necessary according to whether the reception confirmation signal ACK has been sent in response to the message m relayed to each of the LANs 3 mounted on the vehicle and updating the relay processing information Tr stored in the storing means 21; and communication load factor monitoring means 24A, 24B, connected with the ports 20A, 20B respectively, for monitoring a communication load factor in each of the LANs 3 mounted on the vehicle.

Although only the two ports 20A, 20B are shown in FIG. 1 for simplicity, the relay connection unit 4 has a large number of ports.

The relay management means 23 has an unsent number-of-times counter 23C for counting the number of times at which the reception confirmation signal ACK is not successively sent for each identification information ID and an unsent time period timer 23T for counting a period of time in which the reception confirmation signal ACK is not sent for each identification information, when the reception confirmation signal ACK is not sent in response to the messages m relayed based on the relay processing information Tr.

FIG. 2 shows a format of the message m conforming to CAN.

As shown in FIG. 2, the message m of the CAN has at least an arbitration field ma, a data field mb, a CRC field mc, an ACK field md from its top. The data of all fields ma through mc except the ACK field md is transmitted from a transmission node of the message m. The ACK field md is the field in which the reception confirmation signal ACK is sent in response to the message m when the reception node of the message m correctly finishes the reception of the message m.

When the electronic control unit 2 (2A, 2B, ...) having the above-described construction receives the message m via the communication lines 3A, 3B, ..., the identification reception processing means 13 inside the port 10 thereof compares the identification information ID inside the information IDr to be received recorded in the recording means 11 and the identification information ID of the message m being received with each other on occasion and suspends the reception of the message m which is not coincident.

When the port 10 finishes the reception of the message m, the port 10 outputs the message m indicating the finish of the reception thereof to the processing means 12, and the reception confirmation responding means 14 sends the reception confirmation signal ACK in response to the message m.

When the relay connection unit 4 receives the message m via one LAN 3 mounted on the vehicle, the relay processing means 22 thereof compares the message m with the identification information ID in the relay processing information Tr stored in the storing means 21. When the identification information ID of the received message m is present in the relay processing information Tr, the relay connection unit 4 relays the message m to the necessary relay ports 20A, 20B, ... according to the content of the relay processing information Tr.

When the identification information ID of the received message m is not present in the relay processing information Tr, the relay management means 23 generates the relay processing information Tr so that the message m is relayed to all the ports 20A, 20B except the reception port.

Thereafter the relay management means 23 judges whether it is necessary to send the message m according to whether the reception confirmation signal ACK has been sent in response to the received message m and updates the relay processing information Tr stored in the storing means 21.

More specifically, when the reception confirmation signal ACK is not sent, the relay management means 23 actuates the unsent number-of-times counter 23C and the unsent time period timer 23T to count the number of times at which the reception confirmation signal ACK is not successively sent for each identification information ID and count a period of time in which the reception confirmation signal ACK is not successively sent for each identification information ID.

When a value counted by the unsent number-of-times counter 23C and a value, indicating the length of the period of time, which is counted by the unsent time period timer 23T exceed a reference value respectively, the relay management means 23 judges that relay transmission is unnecessary for the LAN mounted on the vehicle from which the reception confirmation signal has not been sent in response to the message m.

It is preferable that the reference values allow the state in which the reception confirmation signal ACK is not sent in response to the message m to be discriminated between a state in which the message m cannot be correctly received owing to other causes such as an electromagnetic noise and a state in which the electronic control unit 2 does not require the message m.

That is, by setting a period of time which is longer than a period of time with a possibility that communication is disabled owing to influence such as noise and a number of times which is more than a number of times with a possibility that communication is successively substandard owing to influence such as noise as the above-described reference value, it is possible to securely detect the state in which the electronic control unit 2 does not require the message m.

It is preferable to clear the relay processing information Tr when the relay connection unit 4 is actuated, when the supply of electric current to the relay connection unit 4 is stopped, and when the relay processing information Tr is reset by a reset means such as a reset button not shown in FIG. 1.

That is, when the construction of the LAN system 1 mounted on the vehicle is altered, by resetting the relay processing information Tr, it is possible to reset the relay processing information Tr in conformity to the construction of the new LAN system 1 mounted on the vehicle. In resetting the relay processing information Tr, a basic type of the relay processing information may be stored in a nonvolatile storing means, such as ROM, in such a way that the relay processing information Tr of only the important message m is set in advance.

By monitoring the communication load factor of each LAN 3 mounted on the vehicle, the communication load factor monitoring means 24A, 24B, ... detect a state in which the communication load factor has decreased.

the relay management means 23 relays the message m, the relay of which has been already judged to be unnecessary, and judges again whether it is actually unnecessary to relay the message m to the LAN 3 mounted on the vehicle, thus periodically updates the relay processing information.

FIG. 3 shows an example of a LAN system 1A mounted on a vehicle to describe the operation of the electronic control unit 2 and that of the relay connection unit 4 having the above-described construction.

In the example shown in FIG. 3, communication lines 3A, 3B, and 3C of three LANs 3 mounted on vehicles are so constructed that the communication lines 3A, 3B, and 3C are relayed to each other by the relay connection unit 4.

The electronic control units 2A, ... are connected to the communication line 3A. The electronic control units 2B, ... are connected to the communication line 3B. The electronic control units 2C, 2D, 2E, ... are connected to the communication line 3C.

As shown in FIG. 3, each of the electronic control units 2B, 2C, 2D, 2E, ... records 0x400, 0x800; 0x300, 0x400, 0x600; and 0x600, 0x700; 0x300, 0x400, 0x500 as the information to be received, IDrb, IDrc, IDrd, Idre, ....

In a state in which the relay processing information Tr is reset, the electronic control units 2A, ... connected with the communication line 3A of the LAN 3 mounted on the vehicle send message m1, m2, and m3 having identification information ID of 0x400, 0x600, and 0x800, and the relay connection unit 4 receives the messages m1 through m3. When the identification information ID of the messages m1, m2, and m3 are not included in the relay processing information Tr, processing described below is executed.

The relay management means 23 sets the relay processing information Tr to relay the message m1 through m3 to all ports except the reception ports that receive the message m1 through m3. Based on it, the relay processing means 22 relays the message m1 through m3 to the communication lines 3B, 3C of the LAN 3 mounted on the vehicle.

Each of the electronic control units 2B, 2C, 2D, 2E, ... compare the identification information ID recorded in the information IDrb, IDrc, IDrd, Idre, ... to be received and the identification information ID of each of the messages m1 through m3 with each other, thus sending the reception confirmation signal ACK of a dominant level to the ACK field md in response to the received message m, when the electronic control units 2B, 2C, 2D, 2E, ... find the necessary message m.

In the example shown in FIG. 3, the electronic control unit 2B sends the reception confirmation signal ACK in response to the message m1, m3. The electronic control unit 2C sends the reception confirmation signal ACK in response to the message m2. The electronic control unit 2D sends the reception confirmation signal ACK in response to the message m2. The electronic control unit 2E sends the reception confirmation signal ACK in response to the message m1.

The relay connection unit 4 confirms the reception confirmation signal ACK in response to the messages m1 through m3 sent to the communication lines 3B, 3C of the LANs 3 mounted on the vehicles.

In the example shown in FIG. 3, of the messages m1 through m3 relayed to the communication line 3B of the LAN 3 mounted on the vehicle, the electronic control unit 2B outputs an ACK bit for the message m1 having the identification information ID of 0x400 and for the message m3 having the identification information ID of 0x800, whereas any of the electronic control units 2 do not output the ACK bit for the message m2 having the identification information ID of 0x600. Hence an error frame.

Similarly, of the messages m1 through m3 relayed to the communication line 3C of the LAN 3 mounted on the vehicle, the electronic control units 2C and 2D output the ACK bit for the message m2 having the identification information ID of 0x600. The electronic control unit 2E outputs the ACK bit for the message m1 having the identification information ID of 0x400. But any of the electronic control units 2 do not output the ACK bit for the message m3 having the identification information ID of 0x800. Hence an error frame.

Therefore the relay management means 23 inside the relay connection unit 4 updates the relay processing information Tr for the communication lines 3B, 3C of each LAN 3 mounted on the vehicles to execute routing of the identification information ID for which the reception confirmation signal ACK can be detected.

In the example shown in FIG. 3, the message m1 having the identification information ID of 0x400 and the message m3 having the identification information ID of 0x800 are relayed from the communication line 3A of the LAN 3 mounted on the vehicle to the communication line 3B, whereas the message m2 having the identification information ID of 0x600 is not transferred. Similarly the message m1 having the identification information ID of 0x400 and the message m2 having the identification information ID of 0x600 are relayed from the communication line 3A of the LAN 3 mounted on the vehicle to the communication line 3C, whereas the message m3 having the identification information ID of 0x800 is not transferred.

As described above, the relay processing information Tr can be so set that the message m is relayed to only the LAN 3, mounted on the vehicle, to which the electronic control unit 2 requiring the message is connected.

What is claimed is:

1. A Local Area Network (LAN) system mounted on a vehicle comprising a plurality of LANs, mounted on said vehicle, each having at least one electronic control unit connected with a communication line to send and receive messages; and a relay connection unit, connected with said communication line, for relaying said messages between said LANs mounted on said vehicle, wherein each electronic control unit has a reception port having a function of sending a reception confirmation signal to said relay connection unit in response to a received message; and said relay connection unit has a relay management means for judging whether relay is necessary according to whether said reception confirmation signal has been sent in response to said message relayed to each of said LANs mounted on said vehicle, and updating relay processing information stored in a storing means, wherein when said relay management means of said relay connection unit receives identification information not included in said relay processing information, said relay management means newly registers said identification information in said relay processing information so that relay transmission is executed for all ports except said reception port.

2. The LAN system mounted on said vehicle according to claim 1, wherein:

each of said electronic control units further has:
a recording means for recording identification information of messages to be received; and
said reception port has a function of selectively receiving said messages indicating said identification information recorded in said recording means and sending a reception confirmation signal to said relay connection unit in response to said received message, and
said relay connection unit further has:
said storing means for storing relay processing information, of messages received through ports connected with each of said LANs mounted on said vehicle, indicating a relationship between identification information to be relayed and a relay port; and
a relay processing means for executing relay processing of said messages indicating said identification information stored in said storing means.

3. The LAN system mounted on said vehicle according to claim 1, wherein when said reception confirmation signal is not sent in response to said message relayed based on said relay processing information, said relay management means has an unsent number-of-times counter for counting a number of times at which said reception confirmation signal is not successively sent for each of said identification information or/and an unsent time period timer for counting a period of time in which said reception confirmation signal is not sent for each of said identification information, and
when a value counted by said unsent number-of-times counter or/and a value, indicating a length of said period of time, which is counted by said unsent time period timer exceed a reference value respectively, said relay management means judges that relay transmission is unnecessary for said LAN mounted on said vehicle from which said reception confirmation signal has not been sent in response to said message.

4. The LAN system mounted on said vehicle according to claim 1, wherein said relay connection unit has a communication load factor monitoring means for monitoring a communication load factor of each of said LANs mounted on said vehicle, and
said relay management means relays a message, relay of which has been already judged to be unnecessary, to each of said LANs mounted on said vehicle. thus periodically updates said relay processing information by using said reception confirmation signal in response.

5. The LAN system mounted on said vehicle according to claim 1, wherein said reception port of said electronic control unit has an identification reception processing means, composed of a hardware, for sequentially comparing identification information of a message being received with identification information recorded in said recording means and suspending reception of a message which is not coincident with said identification information recorded in said recording means.

6. An electronic control unit connected to a Local Area Network (LAN) mounted on a vehicle, comprising:
a reception port connected to the LAN; and
a recording means for recording identification information of a message to be received, wherein said reception port has a function of selectively receiving a message holding said identification information recorded in said recording means and sending a reception confirmation signal in response to said received message to a port which has sent said message, wherein said reception port of said electronic control unit has an identification reception processing means, composed of a hardware, for sequentially comparing identification information of a message being received with identification information recorded in said recording means and suspending reception of a message which is not coincident with said identification information recorded in said recording means.

7. A relay connection unit, connected to a plurality of LANs mounted on a vehicle, for relaying messages between said LANs mounted on said vehicle, comprising:

a storing means for storing relay processing information, of messages received through ports connected with each of said LANs mounted on said vehicle, indicating a relationship between identification information to be relayed and a relay port;

a relay processing means for executing relay processing of a message having said identification information stored in said storing means; and a relay management means for judging whether relay is necessary according to whether a reception confirmation signal has been sent in response to said message relayed to each of said LANs mounted on said vehicle, and updating relay processing information stored in said storing means, wherein when said relay management means receives new identification information not included in said relay processing information, said relay management means newly registers said new identification information in said relay processing information.

* * * * *